(Model.)

H. F. PUMPHREY.
COUPLING FOR WIRES AND ELECTRIC CONDUCTORS.

No. 270,478. Patented Jan. 9, 1883.

Witnesses:
Alex Scott
J. R. Gantt.

Inventor.
Henry F. Pumphrey.

United States Patent Office.

HENRY F. PUMPHREY, OF FAIRFIELD, IOWA.

COUPLING FOR WIRES AND ELECTRIC CONDUCTORS.

SPECIFICATION forming part of Letters Patent No. 270,478, dated January 9, 1883.

Application filed August 12, 1881. Renewed July 20, 1882. (Model.)

*To all whom it may concern:*

Be it known that I, H. F. PUMPHREY, a citizen of the United States, residing at Fairfield, in the county of Jefferson and State of Iowa, have invented a Coupling for Wires and Electric Conductors, of which the following is a specification.

Said invention has not been patented to me or to others with my consent or knowledge in a foreign country.

Figure 1:
Figure 2:
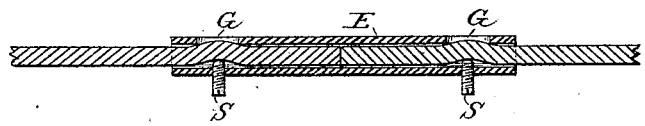
Figure 3:
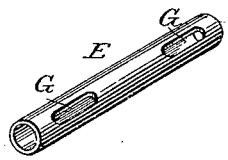

The object of my invention is to furnish a one-part tubuliform metallic coupling for wires and electrical conductors, described as follows:

Figures 1, 2, and 3 refer to different views in the drawings, and letters to different parts of the views. Fig. 3 shows coupling E, which is a metallic tube in one part, with set-screws S S near the ends of same, with slots G G opposite set-screws S S. Fig. 1 shows coupling E, joining two small wires to one of larger size or number. The small wires are both pressed into slot G by set-screw S. In this manner they are securely coupled to the larger wire. Fig. 2 shows the curve or bend in the wires made by set-screws S S, which force the wires to bend into the slots G G.

The invention consists in the construction of the tubuliform metal joiner, made in one part, (shown in Figs. 1, 2, and 3,) with set-screws S S near the ends, with slots G G opposite the set-screws.

I am aware that joiners have been patented; but I am not aware and do not know and do not believe that a joiner claiming the combination of points that I do in this was ever before known or used. Therefore I do not claim joiners, broadly; but

What I claim, and desire to secure by Letters Patent of the United States, is—

A coupling for wires and electric conductors, consisting of a metallic tube or sleeve provided with a slot near each end of such tube, and threaded apertures, one opposite each of such slots, and set-screws fitted to the threaded aperture, as and for the purpose specified.

H. F. PUMPHREY.

Witnesses:
J. S. McKEMEY,
H. C. RANEY.